US 9,762,740 B2

(12) United States Patent
Prodanovic (10) Patent No.: US 9,762,740 B2
(45) Date of Patent: Sep. 12, 2017

(54) PREVENTING DOUBLE DIGIT DETECTION CAUSED BY IN-BAND DUAL-TONE MULTI-FREQUENCY SIGNALING (71) Applicant: Radovan Prodanovic, Kanata (CA)

(72) Inventor: Radovan Prodanovic, Kanata (CA)

(73) Assignee: Mitel Networks Corporation, Ottawa Ontario (CA)

( * ) Notice: Subject to any disclaimer, the term of this patent is extended or adjusted under 35 U.S.C. 154(b) by 82 days.

(21) Appl. No.: 14/176,927

(22) Filed: Feb. 10, 2014

(65) Prior Publication Data

US 2015/0229772 A1 Aug. 13, 2015
US 2017/0201628 A9 Jul. 13, 2017

Related U.S. Application Data (63) Continuation-in-part of application No. 13/419,637, filed on Mar. 14, 2012, now abandoned.

(51) Int. Cl.
H04L 12/66 (2006.01)
H04L 12/16 (2006.01)
G06F 15/00 (2006.01)
H04M 7/12 (2006.01)
H04L 12/875 (2013.01)

(52) U.S. Cl.
CPC .......... H04M 7/1295 (2013.01); H04L 47/56 (2013.01)

(58) Field of Classification Search
CPC ............................ H04M 7/1295; H04L 47/56
See application file for complete search history.

(56) References Cited

U.S. PATENT DOCUMENTS 6,298,055 B1 * 10/2001 Wildfeuer ...................... 370/352
6,563,599 B1 * 5/2003 Whitfield ...................... 358/1.15
6,650,662 B1 11/2003 Arnaud et al.
8,446,846 B1 * 5/2013 Saleem et al. ................. 370/260

FOREIGN PATENT DOCUMENTS

CA         2171485          10/1999
WO         WO 96/32817 A1   10/1996
WO         WO 01/28256 A1   4/2001

* cited by examiner

Primary Examiner — Kiet Tang (57) ABSTRACT

A T2P (TDM to packet) delay buffer is provided. The delay buffer can prevent double digit detections caused by in-band DTMF leak when out-of-band DTMF is used. The T2P delay buffer is initialized with an audio pattern that represents silence in a configurable amount of delay. When a DTMF digit is detected, the system can stop taking the voice payload from the T2P delay buffer and start injecting RFC4733 RTP packets into the RTP stream at a pre-configured rate. The RFC4733 DTMF RTP packets continue to be injected into the RTP stream until the DTMF digit stops. Once the end of the DTMF digit is detected, the content of the T2P delay buffer can be discarded and the T2P delay buffer is reinitialized with an audio pattern that represents silence in a configurable amount of delay. After the T2P delay buffer is reinitialized, the voice packetization can be continued.

20 Claims, 4 Drawing Sheets

PREVENTING DOUBLE DIGIT DETECTION CAUSED BY IN-BAND DUAL-TONE MULTI-FREQUENCY SIGNALING

CROSS REFERENCE TO RELATED APPLICATION

This application includes subject matter that is related to and claims priority from U.S. patent application Ser. No. 13/419,637 filed on Mar. 14, 2012.

TECHNICAL FIELD

This disclosure generally relates to communications, and more particularly, to preventing double digit detection in a downstream circuit-switched network caused by in-band dual-tone multi-frequency (DTMF) leaks when the voice path goes through a packet-switched network and out-of-band DTMF is used within the packet-switched network.

BACKGROUND

DTMF signaling is used in telecommunications as a form of signaling over analogue and digital telephone lines in the voice-frequency band between telephone handsets and other communication devices, as well as between communication devices without human involvement DTMF signaling and the protocols based on the DTMF signaling were designed to work well in circuit-switched networks, where both the voice and the DTMF share the same frequency band but cannot go through at the same time. Thus, the DTMF signaling in circuit-switched networks is said to be carried in-band. The sending endpoint generates DTMF tones. The receiving endpoint, when required, listens for the DTMF tones by deploying a device called a DTMF detector, a device that detects DTMF tones and reports them to call control.

To guard against false signal detection, for example voice detected as a DTMF tone, DTMF detectors have to be configured not to recognize DTMF signals whose duration is below a certain minimum. To guard against erroneous double digit detection, if a signal is interrupted by a short break in transmission or by a noise pulse and once the DTMF digit detection has started, interruptions shorter than a specified minimum must not be recognized by DTMF detectors. As an example of double digit detection, when a sending endpoint sends DTMF signals "123456789", the DTMF detector at the receiving endpoint could detect and report "11234556678899".

If the DTMF has to go through a packet-switched network, it can be carried either in-band or out-of-band. When DTMF signaling is carried in-band through a packet-switched network, the DTMF is treated as voice and the DTMF signaling goes through the packet network undetected. There are several issues with carrying DTMF signaling in-band through packet-switched networks. First, only some voice codecs, for example G711, can encode the DTMF signal accurately. Most compression algorithms would change the signal in such a way that it cannot be detected reliably after decoding. This means that packet-switched networks would not be able to take advantage of voice compression when DTMF signaling is required in a call. Second, packet jitter, packet delay, and/or packet loss, all of which are inherently present in packet-switched networks, can cause breaks in DTMF signals that are longer than the accepted minimum. As a result, DTMF detectors could interpret such DTMF signals either as double digits or digits can go undetected all together.

To avoid those issues described above, a more reliable method for carrying DTMF through packet-switched networks is devised whereby DTMF signals are detected via DTMF detectors at the ingress of the packet-switched network and then sent as special DTMF signaling packets into the packet-switched network, either as a substitute for the in-band DTMF, or concurrently with the packetized in-band DTMF, and thus the name out-of-band DTMF. One example of a packet-switched network is an IP network and an example of a protocol used to transport voice through an IP network is RTP, specified in IETF documents RFC3550/RFC3551, and RFC4733, that describes how to carry DTMF signaling, other tone signals and telephony events in RTP packets, that is, out-of-band.

The process of detection of DTMF signals takes a finite amount of time. Once a DTMF signal is detected, the DTMF detector reports this event to call control. It takes a certain amount of time for this to be processed by call control and for out-of-band DTMF signaling packets to begin to be injected. During this time the in-band DTMF continues to be carried through and represents in-band DTMF leak. Thus, even if the out-of-band DTMF signaling is used exclusively through the packet switched network, i.e., the packet network is configured to carry only the out-of-band DTMF signaling and to drop the in-band DTMF, some amount of the in-band DTMF signals may end up been sent as a packetized voice/audio before the out-of-band packets start being sent because it takes a finite amount of time to reliably detect a DTMF digit.

If a call carrying out-of-band DTMF signaling is terminated within the packet-switching network, the receiving endpoint within this network consumes the special DTMF signaling packets, for example RFC4733 RTP packets, and the DTMF signaling stays in out-of-band form. The leaked through in-band DTMF does not impact the ability of the receiving endpoint to recognize and interpret the out-of-band DTMF signaling packets and to act upon them. Even though the leaked in-band DTMF could be heard at the receiving endpoint, this does not impact the signaling decisions of the receiving endpoint because the receiving endpoint acts upon the out-of-band DTMF signals rather than upon the in-band DTMF signals.

If, on the other hand, the packet-switching network is just an intermediate network and the call has to be routed back into a circuit-switched network to reach its receiving endpoint, the out-of-band DTMF signaling has to be converted back to in-band DTMF form at the egress of the packet-switching network before it can be inserted into the circuit-switched network. Now a mix of the leaked in-band DTMF and the regenerated in-band DTMF is used. Depending on the amount of the leaked in-band DTMF, its relative position and phase to the regenerated in-band DTMF, and characteristics of the downstream DTMF detector, either the one at the receiving far endpoint or another intermediate one, the DTMF detector can interpret this as a double digit.

A need therefore exists for a system preventing double digit detection caused by in-band DTMF signaling and methods thereof that overcome those issues described above. These, as well as other related advantages, will be described in the present disclosure.

BRIEF DESCRIPTION OF DRAWINGS

In the descriptions that follow, like parts are marked throughout the specification and drawings with the same numerals, respectively. The drawing Figures are not necessarily drawn to scale and certain Figures can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein.

DESCRIPTION OF THE DISCLOSURE

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the scope of this invention.

Generally described, the present disclosure relates to communications, and more particularly, to a system preventing double digit detection caused by in-band DTMF signaling and methods thereof. In an illustrative embodiment, a T2P delay buffer is provided. The voice payload always has to be pushed through the T2P delay buffer. The T2P delay buffer is characterized by its enqueuing rate, dequeueing rate, maximum number of queued packets, and as such provides both a delay line and a packet rate adaption functionality. The T2P delay buffer can prevent double digit detections caused by in-band DTMF leak when out-of-band DTMF is used. During call setup, if the DTMF detection is required, the T2P delay buffer is initialized with an audio pattern that represents silence in a configurable amount of delay that can be dependent on the amount of time it takes to detect the DTMF digit. If the DTMF detection is not required, the T2P delay buffer is initialized with zero delay. After the call setup, the voice path can be established. When a DTMF digit is detected in the voice path, the system can stop taking the voice payload from the T2P delay buffer and start injecting RFC4733 RTP packets into the RTP stream at a pre-configured rate, thereby leaving most or all of the audio payload that contains the beginning of the detected in-band DTMF tone in the T2P delay buffer. The RFC4733 DTMF RTP packets continue to be injected into the RTP stream until the in-band DTMF digit is detected to have stopped. Once the end of the DTMF digit is detected, the content of the T2P delay buffer can be discarded and the T2P delay buffer is reinitialized with an audio pattern that represents silence in a configurable amount of delay. The configured amount of delay can be dependent on the amount of time it takes to detect the DTMF digit. After the T2P delay buffer is reinitialized, the voice packetisation can be continued. Note that if the requirement to detect the DTMF signals is no longer active, the T2P delay buffer can be initialized with no delay added to it, thus reducing the round trip delay when the DTMF detection is not needed.

A number of advantages can be offered by the illustrative embodiment described above. The system can be less susceptible to jitter, delay and packet loss than previous networks and systems. Because a cause of double digit detection, in the context of the scenario described above, is addressed at the source of the DTMF signal leak, on the TDM to packet side (T2P) at the ingress of the packet-switched network, some constraints on certain components on the packet to TDM side (P2T) can be relaxed.

Firstly, and by way of a non-limiting illustration, the initial play-out delay of the jitter buffer on the P2T side can be decreased or even eliminated.

Secondly, also by way of a non-limiting illustration, because the amount of delay added to the T2P delay buffer is configurable, if enough delay is added to the T2P delay buffer, the leaked in-band DTMF can be completely eliminated, which can be important in applications that require DTMF suppression, that is, elimination of the in-band DTMF signals from the audio path. However, the amount of delay added to the T2P buffer can be selected to be so low that DTMF is not completely eliminated, but instead allows some in-band DTMF to leak through. As long as the amount of DTMF that leaks through is not sufficient to cause DTMF detection at the far end circuit switched network (packet to TDM side), this avoids double digit detection. However, it allows this to be achieved with less latency or delay, thus improving overall voice quality, compared to the case where DTMF is completely removed.

Many additional advantages of the present disclosure will become apparent to those skilled in the relevant art as provided for in the following description.

Figure 1:
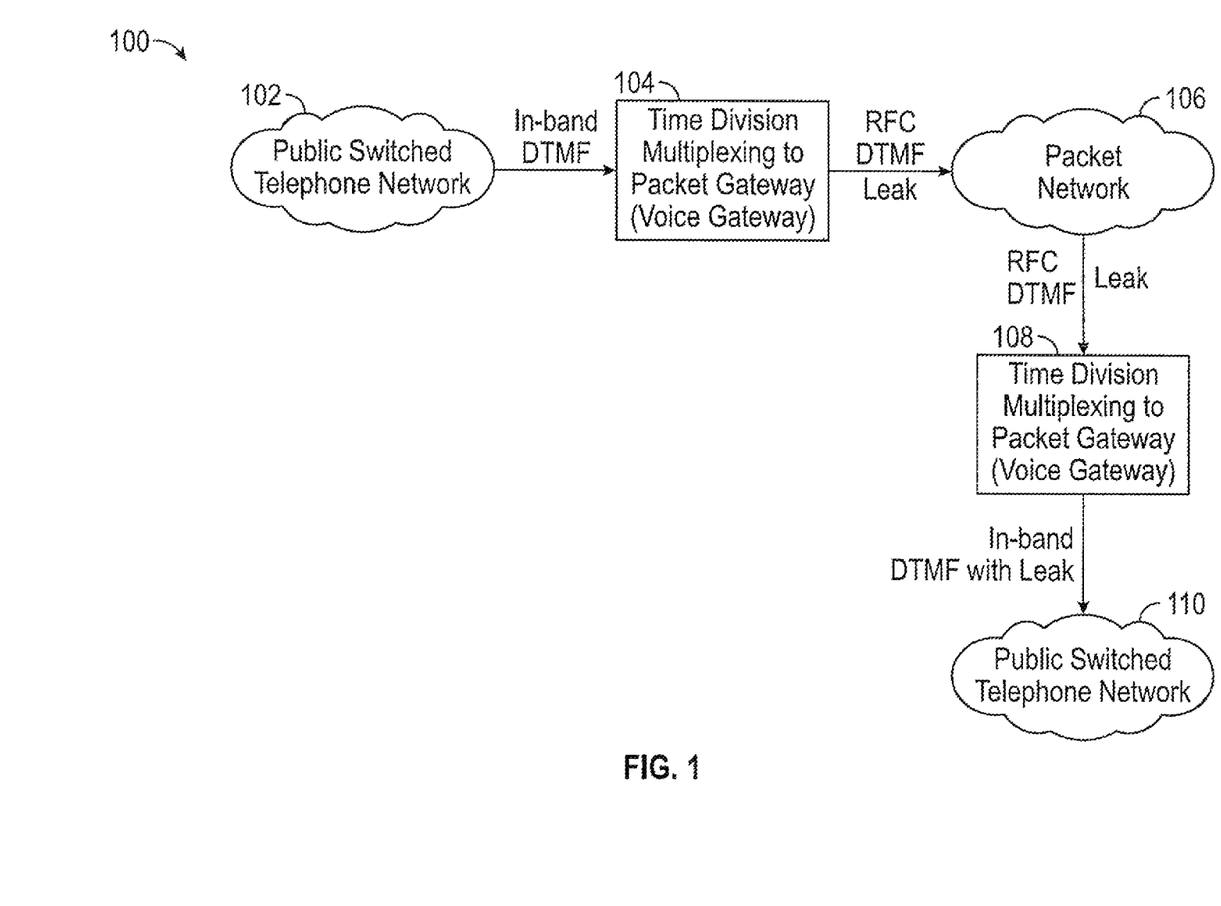
FIG. 1 is a block diagram illustrating in-band DTMF leaks causing double digit detections in a downstream circuit-switched network caused by in-band DTMF leaks when the voice path goes through a packet network and out-of-band DTMF is used within the packet network in accordance with one or more aspects of the present disclosure.
Figure 2:
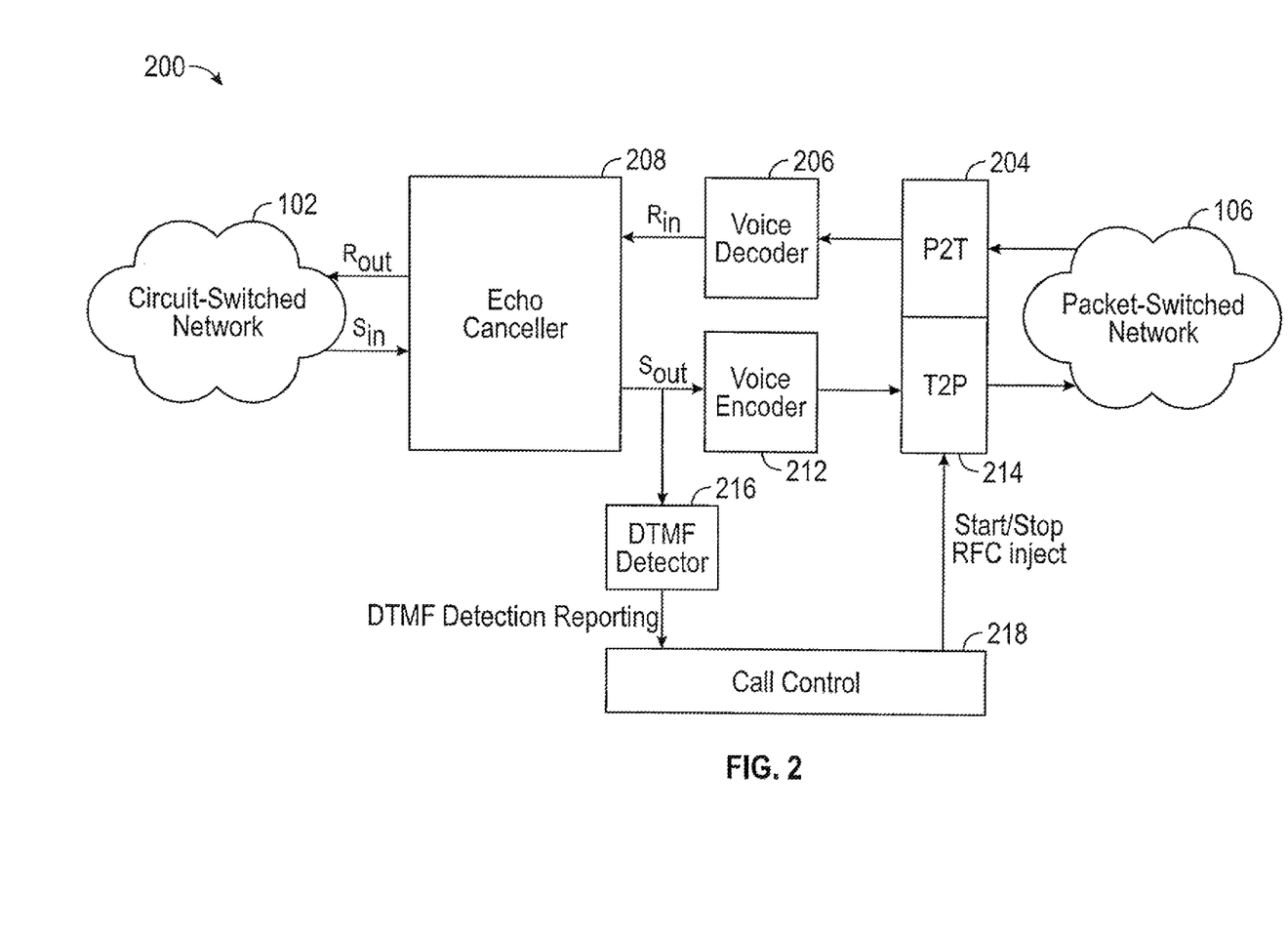
FIG. 2 is a block diagram depicting typical components of a TDM to IP and/or IP to TDM voice call in accordance with one or more aspects of the present disclosure.
Figure 3:
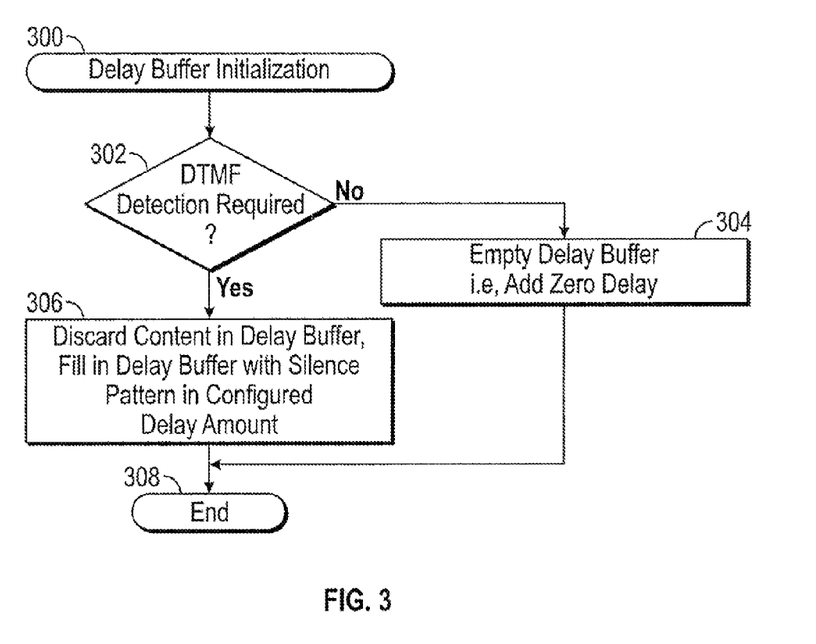
FIG. 3 is a flow chart showing illustrative procedures for initializing a T2P delay buffer in accordance with one or more aspects of the present disclosure.
Figure 4:
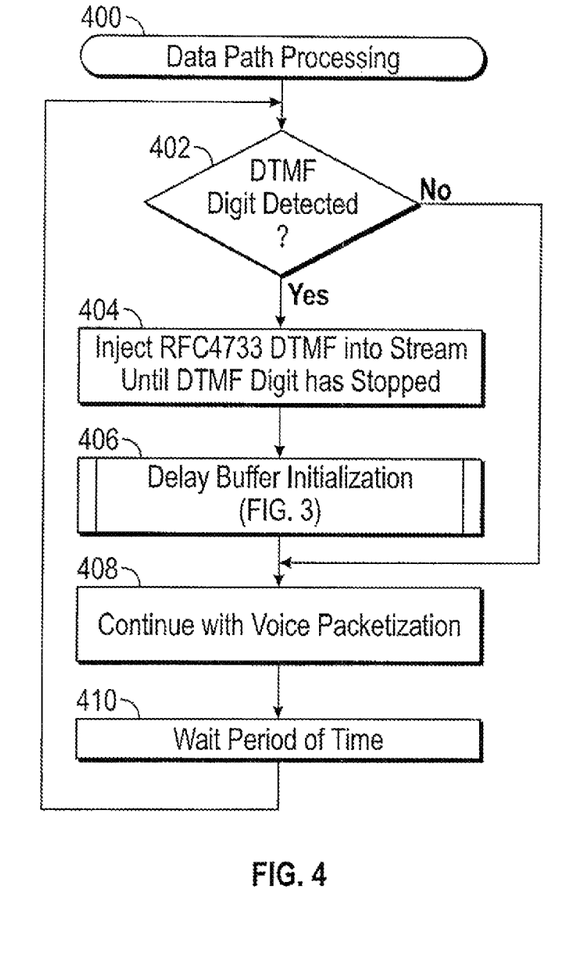
FIG. 4 is a flow chart showing illustrative procedures for packet processing within a T2P data/voice path in accordance with one or more aspects of the present disclosure.
Figure 5:
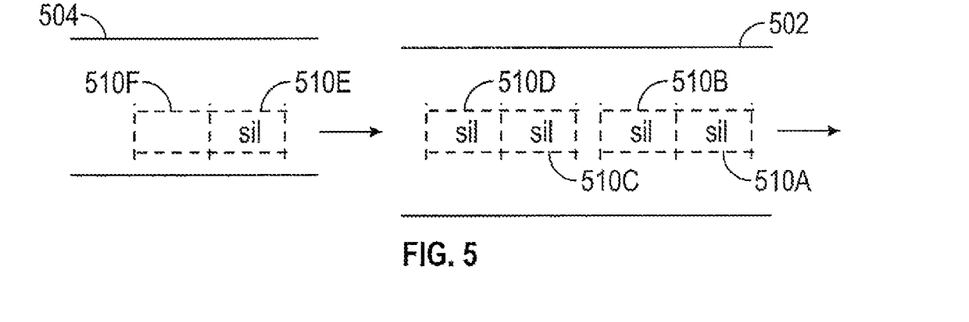
FIG. 5 is a block diagram depicting illustrative procedures for assembling packets for a T2P delay buffer in accordance with one or more aspects of the present disclosure.

An exemplary environment for double digit detection caused by in-band DTMF is provided in FIG. 1. FIG. 2 shows one embodiment of preventing double digit detection. FIGS. 3 and 4 depict flow charts for minimizing/eliminating in-band DTMF leak at the source of the leak, and thus preventing double digit detection in the context of the scenario described above. FIG. 5 shows processing of packets within the T2P delay buffer. These Figures are not intended to be limiting, but rather provided to disclose features and concepts herein. Within the present disclosure, the T2P delay buffer can be referred to as an output queue. The T2P delay buffer can also be referred to as an egress packet queue. The T2P delay buffer can be implemented within hardware, software or combination of both.

FIG. 1 is a block diagram illustrating in-band DTMF leaks causing double digit detections in a downstream circuit-switched network caused by in-band DTMF leaks when the voice path goes through a packet network and out-of-band DTMF is used within the packet network in accordance with one or more aspects of the present disclosure. Double digit issues arise when the voice path goes through a packet network 106 and when out-of-band DTMF signaling is used. As an example of double digit detection, when a caller dials "123456789", software can detect "11234556678899".

To carry DTMF signaling over a packet network 106 reliably, the in-band DTMF signaling coming from a Public Switched Telephone Network (PSTN) 102 (circuit switched network) is converted into RFC4733 DTMF. By converting the in-band DTMF, the system 100 makes the DTMF signal less susceptible to jitter, delay and packet loss that is present in packet networks. Because the substitution of the in-band DTMF with RFC4733 DTMF takes a finite amount of time to detect the in-band DTMF digit by the time division multiplexer (TDM) to packet gateway 104, or voice gateway, a certain amount of the in-band DTMF leaks through at the source to the packet network 106, that is, at the TDM to internet protocol (IP) interface and gets carried together with the RFC DTMF through the packet network 106.

The leaked in-band DTMF is then provided to the TDM to packet gateway 108 (voice gateway) by the packet network 106. The in-band DTMF is regenerated from the RFC4733 DTMF at the egress of the packet-switching network 106, for example, the receiver propagates tone signaling accurately into the PSTN 110 for machine consumption. In this scenario, it is possible that the leak gets interpreted as a double digit by a far end device if the amount of leaked in-band DTMF is sufficient.

Previously, if RFC4733 DTMF in TDM-IP-TDM scenarios 100 were enforced, whether or not the leaked in-band DTMF made it back into the PSTN 110 (circuit-switched network), depended on the amount of delay in the jitter buffer implemented by P2T in the TDM to packet gateway 108. If the amount of accumulated audio in this jitter buffer was large enough, the leaked in-band DTMF would not be played out because the P2T would receive the RFC4733 DTMF packet and start regenerating the in-band DTMF which would preempt 2 playing the accumulated audio from the jitter buffer. In P2T there are basically two queues, one for audio payload, the so called jitter buffer, and one for the DTMF digits. The P2T processes RFC4733 DTMF at a higher priority compared to the audio payload. So when there is enough audio payload accumulated in the P2T jitter buffer and the in-band DTMF that leaked into the audio stream is at the tail end of the P2T jitter buffer, the received RFC4733 DTMF digits could be played out before the accumulated audio that contains the leaked in-band DTMF. Proper handling of the RFC4733 DTMF assumes that the P2T audio jitter buffer gets emptied after the RFC4733 DTMF digits are processed. So the amount of the accumulated delay in the TDM to packet gateway voice path P2T jitter buffer can be enough to mask the leaked in-band DTMF.

Nevertheless, in packet voice applications it is important to minimize delay in the voice path. The lower the delay, the less expensive the echo cancelling. This translates to lower cost and greener products in terms of energy consumption. Therefore a goal is to decrease the P2T delay, and minimize or eliminate the amount of delay needed in the P2T jitter buffer. In the past, there was no buffering on the T2P path, that is, there was no added delay in the T2P direction. Now, with the decreased buffering in the P2T direction, the P2T would underflow more frequently. In underflow conditions, the P2T can inject silence or perform a more sophisticated packet loss concealment algorithm. For the audio, this typically does not cause any perceivable impact. If, however, the P2T underflow happens during the play out of the leaked in-band DTMF, the in-band DTMF can be interrupted. This in some cases can cause the double digit detection by the next in chain DTMF detector.

DTMF detection has been implemented on far end T2Ps in TDM-IP-TDM scenarios, for example a toll bypass application, to help generate DTMF on the near end more reliably so that network jitter would not result in double digits if the DTMF would be carried in-band. Now that the RTP receiver has to regenerate TDM DTMF from the RFC4733 DTMF, the excessive amount of the leaked in-band DTMF, even when it ends up back-to-back with the regenerated DTMF, can have a different phase compared to the regenerated DTMF and some DTMF detectors, that are sensitive to the phase, would treat this as two separate digits. Experiments have shown that on an idle system, with a packet time set to ten (10) milliseconds and a DTMF detection report time of forty-eight (48) milliseconds, and no added delay in the T2P voice path, the in-band DTMF leak can be in the amount of up to seventy (70) milliseconds.

In FIG. 1, the T2P 104 created an in-band DTMF leak. DTMF in its native form is in audio that can be received from a PSTN 102. RFC4733 DTMF, or the like, was created to make the packet stream DTMF-aware. The in-band DTMF signals from the PSTN 102 are replaced with out-of-band DTMF signals that the packet network 106 knows how to process and deal with. DTMF digits can be detected within the incoming audio. A finite amount of time is required to detect the DTMF digit. Because of this lag, packetized data that should have been abandoned can be "leaked". After the in-band DTMF leak goes through the packet network 106 and the TDM to packet gateway P2T 108, a far end device on the PSTN 110 can receive in-band DTMF having the leaked in-band DTMF and in-band DTMF regenerated out of the RFC4733 out-of-band DTMF. Because of the leaked in-band DTMF, it is possible that the device on the PSTN 110 can detect a double digit.

Turning now to FIG. 2, a block diagram depicting typical components of a TDM to IP (circuit-switched network 102 to packet-switched network 106) and/or IP to TDM (packet-switched network 106 to circuit-switched network 102) voice call in accordance with one or more aspects of the present disclosure is shown. In-band DTMF Sin can be provided by the circuit-switched network 102 to the T2P 214, which can represent a component of a TDM to packet voice gateway 104. Sin can include both voice and DTMF as they can share the same frequency band but generally not at the same time.

From the circuit-switched network 102, Sin can be received by the echo canceller 208 where the voice quality within Sin can be improved. The output Sout of the echo canceller 208 can in turn be sent to a voice encoder 212. At the same time, the same output Sout of the echo canceller 208 can be sent to a DTMF detector 216. The DTMF detector serves a function of detecting in-band DTMF and reporting to the call control 218 when a DTMF digit gets detected, so as to avoid said issues with carrying DTMF signaling in-band through packet-switched networks. At the voice encoder 212, the output Sout of the echo canceller 208 can be either passed through as is to the T2P 214 or it can be compressed and converted for use by the T2P 214. A delay buffer 502 and 504, shown in FIG. 5, can be placed within T2P 214 providing a delay for the audio payload before packets are sent to the packet-switched network 106 through the T2P 214 to allow the DTMF digit detection to be performed.

In operation, the DTMF detector 216 can determine whether a DTMF digit is within Sout. A minimum amount of time is generally required before a digit can be detected within the in-band DTMF resulting in Sout going through the voice encoder 212 and to the T2P 214, and stored within the delay buffer 502. By way of a non-limiting example, after a time of forty-eight (48) milliseconds, the DTMF detector 216 can definitely say that a digit has been detected within Sout. The minimum duration below which a DTMF digit should typically not be recognized by the DTMF detector 216 can be between twenty (20) milliseconds to twenty-five (25) milliseconds. The minimum duration above which a DTMF digit can be recognized is forty (40) milliseconds and the minimum signal interruption below which the digit should not be recognized as a new digit is between ten (10) milliseconds and twenty (20) milliseconds.

After detection of a DTMF digit, the DTMF detector 216 can provide a DTMF detection report to the call control 218 indicating that DTMF digit has been detected. The call control 218 can be alerted that a digit has been detected and processing of the digit should be handled. When a DTMF digit is detected, the call control 218 of the system 200 can signal T2P 214 to start injecting RFC 4377 RTP packets representing the detected DTMF digit. The T2P 214 can then stop taking the voice payload from the delay buffer 502 and 504 within the T2P 214 and start injecting RFC4733 RTP packets into the RTP stream at a pre-configured rate, thereby leaving most or all of the audio payload that contains the beginning of the detected in-band DTMF tone in the T2P delay buffer 502.

At the end of the DTMF digit, the DTMF detector 216 can also provide an additional DTMF detection report to the call control 218. The RFC4733 DTMF RTP packets can continue to be injected into the RTP stream until the DTMF digit stops. Once the end of the DTMF digit is detected, the content of the delay buffer 502 and 504 in the T2P 214 can be discarded and the T2P delay buffer 502 and 504 can be reinitialized with an audio pattern that represents silence in a configurable amount of delay. The configured amount of delay can be dependent on the amount of time it takes to detect the DTMF digit. After the T2P delay buffer 502 and 504 is reinitialized, the voice packetisation of the audio can be continued. If the requirement to detect the DTMF signals is no longer active, the T2P delay buffer 502 and 504 can be initialized with no delay added to it. The call control 218 can determine the amount of audio that can be removed from the audio stream once a DTMF digit is detected. A delay buffer 502 can provide a certain amount of delay into the stream removing the possibilities of double digit detection. The content of the delay buffer 502 and 504 can be discarded so the in-band DTMF does not get leaked to the receiving far end device.

The T2P delay buffer 502 along with the DTMF detector 216 and call control 218 can remove the leaked in-band DTMF previously described, which led to the possibility of double digit detections.

On the egress side coming from the packet-switched network 106, the in-band DTMF is regenerated from the RFC4733 DTMF either at the voice decoder 206 (when the voice is compressed) or at the P2T 204 (if the voice decoder 206 is a pass through). The voice decoder 206 can uncompress and convert the in-band DTMF Rin for use by the echo canceller 208. The echo canceller 208 can improve the voice quality within Rin to Rout and provide Rout to the circuit switched network 102. The play-out delay of the jitter buffer (not shown) in the P2T 204 can be decreased or even eliminated because the T2P 214 can decrease the amount of leaked in-band DTMF to the point that the DTMF remaining in the stream is not sufficient to cause DTMF detection at the far end TDM side, which is 102 in this case.

FIG. 3 is a flow chart showing illustrative procedures for initializing a T2P delay buffer 502 in accordance with one or more aspects of the present disclosure. The delay buffer 502 can be used to provide a configured amount of delay to prevent double digit detection by a DTMF detector 216 in the circuit-switched network 110. The delay buffer 502 can prevent double digit detection caused by in-band DTMF leak when the voice path goes through a packet-switched network 106 and when using RTP and RFC4733 by controlling the amount of leak at the source of the leak, that is, on the T2P 214. By limiting the amount of in-band DTMF that leaks from the T2P 214, double digit detection can be prevented.

The processes for initialization of the delay buffer 502 can begin at block 300.

At decision block 302, the system 200 can determine whether DTMF detection is required. The decision to detect DTMF can be based on a number of factors such as whether other components can handle the in-band DTMF leak. When DTMF detection is not required, or put another way the DTMF requirement is absent, at block 304, the delay buffer can be emptied, that is, a zero delay can be added to the buffer 502. When, however, DTMF detection is required, the call control 218 can configure then initialize the delay buffer 502. This can involve discarding the contents of the delay buffer 502 and then initializing by filling in the delay buffer 502 with a silence pattern in a configured delay amount. The configured delay amount dictates the amount of audio that is buffered at the T2P 214. This parameter is the same as the delay between audio arriving at and leaving from the T2P 214. In general, if the delay is longer than the DTMF detection time, the in-band DTMF can be completely eliminated because the buffer contents corresponding to all times when DTMF was present are discarded. To completely eliminate the in-band DTMF, the amount of needed delay can also depend on the configured packetisation time: the higher the packetisation time, the longer the delay is needed.

The initialization processes can end at block 308.

FIG. 4 is a flow chart showing illustrative procedures for packet processing within a T2P data/voice path 104 in accordance with one or more aspects of the present disclosure. The processes can illustrate what happens in the data path as well as the voice path. Typically, these processes are repeated each tick time, for example, ten (10) milliseconds. The processes can begin at block 400. At decision block 402, a determination can be made whether a DTMF digit has been detected by the DTMF detector 218.

If a DTMF digit has not been detected, the T2P 214 can continue with voice packetisation of incoming TDM voice at block 408. This can involve dequeuing and transmitting packets from the head end of the delay buffer 502 at a preconfigured, constant rate. Dequeuing and transmitting of packets is continued while a received DTMF digit is being detected, but before the DTMF digit is actually detected. Thus jitter is not introduced. When a DTMF digit has been detected, at block 402, the T2P 214 can inject RFC4733 DTMF into the stream until the DTMF digit has stopped, at block 404. Detecting a DTMF digit can involve confirming the presence of a DTMF digit, not merely detecting that a DTMF digit possibly is present. At block 406, the T2P 214 can use the delay buffer initialization processes as described in FIG. 3, where contents within the delay buffer are discarded and the delay buffer 502, 504 is filled with the preconfigured amount of delay. After a DTMF digit has been detected, RFC4733 DTMF signaling packets for the DTMF digit are injected instead of the as packetized received audio. This continues until the received DTMF digit stops.

Block 406 can be performed when the DTMF digit is detected, when the end of the DTMF digit detected, or at any time between the DTMF digit being detected and the end of the DTMF digit being detected.

At block 408, voice packetisation can be continued by restarting packetisation of the received audio into the delay buffer 502 and 504. At block 410, the system 200 can wait for a period of time. This time can be configured based on the requirements of the system 200, for example, ten (10) milliseconds. Control can then be provided back to decision block 402.

Through those processes described above, the delay buffer 502 can be cleared of in-band DTMF leak and filled with a silence pattern to avoid double digit detection. If the delay time introduced by the delay buffer 502 and 504 is sufficiently large that DTMF was detected before any packets containing DTMF were transmitted, the in-band DTMF can be eliminated. In general, if the delay time introduced by the delay buffer is below the DTMF detection time, some DTMF could have leaked out before DTMF was detected. As long as the duration of leaked DTMF is less than the minimum time for the DTMF to be recognized as a valid digit at the far end TDM side, double digit detection is prevented.

Referring to FIG. 5, a block diagram depicting illustrative procedures for assembling packets 510A, 510B, 510C, 510D, 510E and 510F (collectively packets 510) for a T2P delay buffer 502 in accordance with one or more aspects of the present disclosure is shown. As described above, the so DTMF digit detection delay can require the use of a delay buffer 502 that can be within the T2P 214. The T2P 214 can assemble packets 510 in an assembly area 504 at the rate Ri, represented as a single box. Ri can be ten (10) milliseconds, that is, each packet 510 can represent ten (10) milliseconds of TDM voice/data. Other rates can be used, for example, five (5) or twenty (20) milliseconds, however, the minimum rate cannot be below the minimum supported outgoing packet rate in milliseconds.

An enquing rate Re is a rate at which packets 510 are being provided to the delay buffer 502, while a dequeuing rate Rd is a rate at which packets 510 are being processed out of the delay buffer 502. Ptime can represent the outgoing packet rate in milliseconds and it is equal to Rd. In a non-limiting example, Ptime can be from ten (10) milliseconds to eighty (80) milliseconds in steps of ten (10) milliseconds. Because Ptime and Ri can differ, rate adaption is performed on the packet 510 being assembled Pa 510E and 510F within the assembly area 504. When the packet Pa 510E and 510F reaches Ptime, it can get queued from the assembly area 504 onto the delay buffer 502. The example in FIG. 5 demonstrates a case where Ptime can be twenty (20) milliseconds and the configured DTMF detection report time can be forty-eight (48) milliseconds, and consequently the added T2P 214 delay can be fifty (50) milliseconds.

The amount of the delay added to the delay buffer 502 can be configurable on a per call basis and can depend on whether DTMF detection is required and the configured DTMF digit detection report time. For queue initialization, as shown above, if the DTMF detection is not required, the amount of added delay can be zero (0) milliseconds. When the TDM to packet stream is opened, the silence pattern can be queued onto the delay buffer 502 in the amount of the configured delay, Ptime per packet. In one embodiment, the remaining amount of the required delay gets added to a packet Pa 510E and/or 510F being assembled.

When a DTMF digit gets detected, the system stops assembling packets 510 in the assembly area 504 and stops both enqueuing packets 510 to the delay buffer 502 and dequeuing packets 510 from the delay buffer 502, thus minimizing/preventing the in-band DTMF leak, or at least keeping it below the minimum duration for DTMF to be detected as a valid digit at the far end TDM side. The detected DTMF digits start getting injected into the RTP packet stream in the form of RFC4733 DTMF, for example, to the stream leading into the packet switched network 106. When the end of the in-band DTMF digit gets detected, injection of RFC4733 DTMF can stop. A silence pattern referred to as "sil" can get queued onto the delay buffer 502 in the amount of the configured of delay, Ptime per packet. Any remaining amount of the required delay gets added to an assembled packet Pa 510E or 510F in the assembly area 504. The system then restarts the process of assembling packets 510 in the assembly area 502 and restarts both enqueuing packets 510 to the delay buffer 502 and dequeuing packets 510 from the delay buffer 502.

The minimum size of the delay buffer 502, in terms of number of packets 510 that the delay buffer 502 has to accommodate, can depend on a maximum required delay to be inserted and Ri. Assuming that a practical value for the inserted delay is a multiple of Ri, then the minimum number of packets that the delay buffer 502 has to accommodate is a maximum amount of inserted delay divided by Ri. For example, if a maximum delay is fifty (50) milliseconds and Ri is equal to ten (10) milliseconds, then the delay buffer 502 has to be able to accommodate at least five packets 510. As shown in FIG. 5, the packets 510 can fill the delay buffer 502 as well as a portion of the assembly area 504.

When a DTMF digit is detected, the injected amount of delay into the delay buffer 502 can be determined such that the amount of in-band DTMF leak should not cause double DTMF digits. It is recommended to process packet enquing into the delay buffer 502 prior to packet dequeuing from the delay buffer 502 to avoid additional processing delay. Recommended values for the delay can depend on the configured DTMF detection report times and Ri. If for example, Ri is ten (10) milliseconds, the recommended values can be:

| Configured DTMF Detection Report Time | Inserted Delay |
|---|---|
| 32 ms | 30 ms |
| 48 ms | 50 ms |
| 64 ms | 70 ms |

The data structures and code, in which the present disclosure can be implemented, can typically be stored on a non-transitory computer-readable storage medium. The storage can be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the disclosure can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The technology described herein can be implemented as logical operations and/or modules. The logical operations can be implemented as a sequence of processor-implemented executed steps and as interconnected machine or circuit modules. Likewise, the descriptions of various component modules can be provided in terms of operations executed or effected by the modules. The resulting implementation is a matter of choice, dependent on the performance requirements of the underlying system implementing the described technology. Accordingly, the logical operations making up the embodiment of the technology described herein are referred to variously as operations, steps, objects, or modules. It should be understood that logical operations can be performed in any order, unless explicitly claimed otherwise or a specific order is inherently necessitated by the claim language.

Various embodiments of the present disclosure can be programmed using an object-oriented programming language, such as SmallTalk, Java, C++, Ada or C#. Other object-oriented programming languages can also be used. Alternatively, functional, scripting, and/or logical programming languages can be used. Various aspects of this disclosure can be implemented in a non-programmed environment, for example, documents created in HTML, XML, or other format that, when viewed in a window of a browser program, render aspects of a GUI or perform other functions. Various aspects of the disclosure can be implemented as programmed or non-programmed elements, or any combination thereof.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the so embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are intended to be encompassed by the claims. Moreover, nothing disclosed herein is intended to be dedicated to the public regardless of whether such disclosure is explicitly recited in the claims.

What is claimed is:

1. A method for preventing double digit detection in a downstream circuit-switched network caused by in-band Dual Tone Multi-Frequency (DTMF) leaks when a voice path goes through a packet-switched network and out-of-band DTMF is used within the packet-switched network, the method comprising:
    initializing a delay buffer in a time division multiplex to packet network direction with an audio pattern that represents silence in a configurable amount of delay;
    receiving audio,
    when no DTMF digit is detected, packetizing the audio into the delay buffer;
    when a DTMF digit is detected: discontinuing packetisation of the audio, stopping taking audio from the delay buffer, and injecting DTMF signaling packets for the DTMF digit;
    discarding contents within the delay buffer;
    filling the delay buffer with a silence pattern; and
    once the end of the DTMF digit is detected: continuing packetisation of the audio.

2. The method of claim 1, wherein the amount of delay added to the delay buffer is configurable on a per call basis.

3. The method of claim 1, comprising receiving the audio from a circuit-switched network.

4. The method of claim 1, wherein the delay buffer is a Time Division Multiplex to Packet (T2P) delay buffer.

5. The method of claim 1, wherein discarding contents within the delay buffer comprises removing an in-band DTMF leak within the delay buffer.

6. The method of claim 1, wherein the packets injected into the stream for the DTMF digit are RFC4733 DTMF.

7. The method of claim 1, comprising filling a remaining amount of the configurable amount of delay into at least one additional packet outside of the delay buffer.

8. The method of claim 6, comprising determining a time to detect the DTMF digit to add the configurable amount of delay.

9. A device for preventing double digit detection in a downstream circuit-switched network caused by in-band Dual Tone Multi-Frequency (DTMF) leaks when a voice path goes through a packet-switched network and out-of-band DTMF is used within the packet-switched network, the device comprising:
    at least one processor; and
    a memory operatively coupled to the processor, the memory storing program instructions that when executed by the processor, causes the processor to:
        initialize a delay buffer in a time division multiplex to packet interface block with an audio pattern that represents silence in a configurable amount of delay;
        receive audio;
        when no DTMF is detected, packetize the audio into the delay buffer to packet network direction;
        when a DTMF digit is detected: discontinue packetisation of the audio, to inject DTMF signaling packets for the DTMF digit, and to stop taking audio from the delay buffer;
        discard contents within the delay buffer;
        add a silence pattern to the delay buffer; and
        once the end of the DTMF digit is detected: continue packetisation of the audio.

10. The device of claim 9, wherein the amount of silence is dependent on a detection time of the DTMF digit.

11. The device of claim 9, wherein the DTMF digit is detected when the audio represents the DTMF digit for more than forty milliseconds.

12. The device of claim 9, wherein a new DTMF digit is detected when the audio is interrupted between ten milliseconds to twenty milliseconds.

13. The device of claim 9, wherein the packets injected into the stream for the DTMF digit are RFC4733 DTMF.

14. A device as claimed in claim 9, wherein the delay buffer is a Time Division Multiplex to Packet (T2P) delay buffer.

15. The device of claim 14, wherein the instructions when executed by the processor cause the processor to place additional delay into at least one packet outside of said the T2P delay buffer.

16. The device of claim 14, wherein the T2P delay buffer holds a minimum number of packets to accommodate a maximum amount of the delay.

17. A non-transitory computer-readable storage medium having stored thereon computer-readable code, which, when executed by computing apparatus, causes the computing apparatus to perform a method comprising:
- initializing a delay buffer in a time division multiplex to packet network direction with an audio pattern that represents silence in a configurable amount of delay;
- receiving audio;
- when no Dual Tone Multi-Frequency (DTMF) digit is detected, packetizing the audio into the delay buffer;
- when a DTMF digit is detected: discontinuing packetisation of the audio, stopping taking audio from the delay buffer, and injecting DTMF signaling packets for the DTMF digit;
- discarding contents within the delay buffer;
- filling the delay buffer with a silence pattern; and
- once the end of the DTMF digit is detected: continuing packetisation of the audio.

18. The medium of claim 17, wherein the amount of delay added to the delay buffer is configurable on a per call basis.

19. The medium of claim 17, wherein the computer-readable code, when executed by the computing apparatus, causes the computing apparatus to perform receiving the audio from a circuit-switched network.

20. The medium of claim 17, wherein the computer-readable code, when executed by the computing apparatus, causes the computing apparatus to perform filling a remaining amount of the configurable amount of delay into at least one additional packet outside of the delay buffer.

* * * * *